Jan. 9, 1962  YOSHIYUKI NOGUCHI  3,015,964
STEPLESS SPEED CHANGING MEANS
Filed Nov. 23, 1959
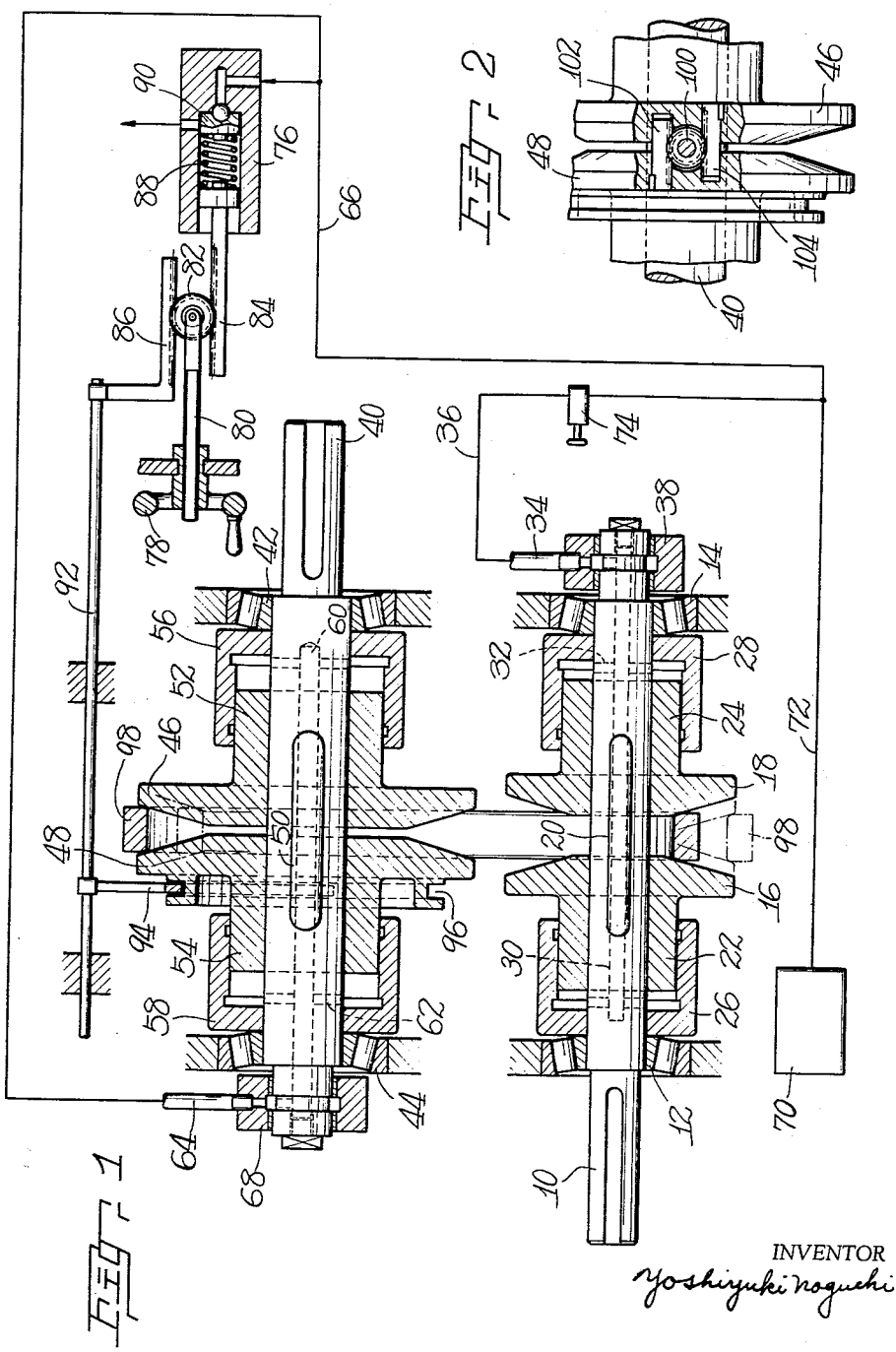
INVENTOR
Yoshiyuki Noguchi
BY Mock & Blum
ATTORNEYS United States Patent Office
3,015,964
Patented Jan. 9, 1962

3,015,964
STEPLESS SPEED CHANGING MEANS
Yoshiyuki Noguchi, 141 Idogaya Kami-cho, Minami-ku, Yokohama-shi, Japan, assignor of fifty percent to Takanosuke Oki, Tokyo, Japan
Filed Nov. 23, 1959, Ser. No. 854,783
2 Claims. (Cl. 74—193)

This invention relates to a stepless speed changing means, and has for its object the provision of a simple and reliable means for driving a shaft at a variable speed and changing the speed steplessly.

Stepless speed changing means have been known in the past but, insofar as is known, because of their complicated mechanism, such means have not been compact enough and reliable.

The stepless speed changing means of this invention may be of small size and is specially useful in driving a shaft at a variable speed and changing the speed steplessly.

Briefly, stated, in accordance with one aspect of this invention, there is provided a driving shaft and a driven shaft. Two pairs of bevel wheels are mounted on the shafts axially slidably, respectively. Each pair of the bevel wheels constitutes a grooved pulley. A steel friction ring is adapted to pass over the two grooved pulleys. Pistons are formed on the backs of the bevel wheels and cylinders are provided to engage with the pistons, respectively. A fluid compressor is provided and a compressed fluid is introduced into the inside of each cylinder so as to press the piston. Position of the steel ring relative to the two grooved pulleys is changed steplessly by means of adjusting a relief valve provided in a fluid pipe between the compressor and one pair of the cylinders, whereby the speed of the driven shaft is changed steplessly relative to the speed of the driving shaft.

The invention will be better understood and other objects and additional advantages of the invention will become apparent upon perusal of the following description taken in connection with the drawings, and the scope of the invention will be defined in the appended claims.

In the drawings, FIG. 1 is a somewhat diagrammatic sectional view illustrating the principle of this invention; and FIG. 2 is an elevational view, partly in section, illustrating a positive means for sliding a pair of bevel wheels symmetrically.

Referring more particularly to the drawings, the preferred embodiment of this invention will now be described; however, this description will be understood to be illustrative of the invention and not as limiting it to the particular construction shown and described. There are two shafts arranged parallel with each other. One is the driving shaft 10 and the other is the driven shaft 40. The shaft 10 is supported by two bearings 12 and 14. The shaft 40 is supported by two bearings 42 and 44. Two bevel wheels 16 and 18 identical with each other are mounted on the driving shaft 10 symmetrically with each other so as to constitute a grooved pulley between the two bearings 12 and 14. Two bevel wheels 46 and 48 are mounted on the driven shaft 40 symmetrically with each other so as to constitute a grooved pulley between the two bearings 42 and 44. A steel friction ring 98 is adapted to pass over the two grooved pulleys, and the diameter of the ring 98 intersects the axes of the two grooved pulleys.

The four bevel wheels 16, 18, 46, and 48 are slidable axially but not rotatable relative to the shafts 10 and 40, by means of keys 20 and 50 and corresponding flutes, respectively. Four pistons 22, 24, 52, and 54 are provided on the backs of and preferably integral with the four bevel wheels 16, 18, 46, and 48, respectively. There are cylinders 26, 28, 56, and 58 adjoining the four bearings 12, 14, 42, and 44, which are adapted to engage with the four pistons 22, 24, 52, and 54, so as to slide the four bevel wheels 16, 18, 46, and 48 axially, respectively. Central bores 30 and 60 are provided inside the shafts 10 and 40, each having an end communicating with the spaces between the cylinders 26 and 56 and the pistons 22 and 52, respectively. Opposite spaces between the cylinders 28 and 58 and the pistons 24 and 54 also communicate with the bores 30 and 60 by means of passageways 32 and 62, respectively. The other ends of the bores 30 and 60 communicate with fluid inlets 34 and 64, respectively. A fluid compressor 70 is provided to force a fluid such as an oil under pressure into a fluid pipe 72 which is divided into two branch pipes 36 and 66 which are connected with the fluid inlets 34 and 64, respectively. Casings 38 and 68 are provided around the shafts 10 and 40 outside the bearings 14 and 44 so as to provide a fluid tight connection between the fluid inlets 34 and 64 and the bores 30 and 60.

The branch pipe 36 has a relief valve 74 interposed therein which is adapted to keep the fluid at a predetermined pressure in the spaces inside the cylinders 26 and 28. The branch pipe 66 is provided with another relief valve 76. The relief valve 76 acts normally similarly to the relief valve 74, but when a handle 78 is operated it acts particularly. That is, the relief valve 76 varies the pressure of the fluid at the spaces inside the cylinders 56 and 58 temporarily and an automatic and prompt restoration in pressure to the original extent follows the variation in pressure. Such a function of the relief valve 76 is attained by the following mechanism.

The handle 78 is connected with a rod 80 so as to slide the latter axially. An end of the rod 80 carries a pinion 82 which is in engagement with two racks 84 and 86 so as to constitute a differential gear mechanism for the relief valve 76. The rack 84 compresses a coil spring 88 which, in turn, presses a piston 90 which faces a space communicating with the branch pipe 66 and filled with the fluid compressed by the compressor 70, so that when the rack 84 is moved towards the relief valve 76 the fluid pressure in the branch pipe 66 and in the spaces inside the cylinders 56 and 58 is made higher than that in the branch pipe 36 and vice versa. The other rack 86 is fixed to an axially slidable rod 92 which carries a fork 94 fixed thereto. The fork 94 is in engagement with an annular groove 96 formed around the back of the bevel wheel 48 so that, although the fork 94 is not rotated with the bevel wheel 48, the former is forced to move in accordance with the axial movement of the latter.

In operation, when the driven shaft 40 is driven by the driving shaft 10 in equilibrium at a constant speed, parts of this means are positioned as shown by the solid lines in FIG. 1. Accordingly, the relief valve 74 is the same with the relief valve 76 in working pressure.

Now the handle 78 is turned so that the rod 80 is slid leftwards in FIG. 1. Because the piston 54 is pressed by the fluid inside the cylinder 58 at the predetermined pressure, the bevel wheel 48, the fork 94, the rod 92, and the rack 86 are restrained from a leftward sliding. Therefore, the leftward motion of the rod 80 brings about a leftward sliding of the rack 84 together with a rotation in clockwise direction of the pinion 82. When the rack 84 moves leftwards, the piston 90 is moved leftwards by virtue of an unbalance in pressure resulting in reduction of the pressure in the branch pipe 66, the bore 60, and the cylinders 56 and 58. Thus the fluid pressure working on the pistons 52 and 54 in the cylinders 56 and 58 becomes lower than that working on the pistons 22 and 24 in the cylinders 26 and 28. As a result the two bevel wheels 46 and 48 recede from each other and the two bevel wheels 16 and 18 approach each other to position the four bevel wheels 16, 18, 46, and 48 and the steel ring 98 as shown by broken lines in FIG. 1. Thus as the effective diameters of the bevel wheels 46 and 48 are decreased while the effective diameters of the bevel wheels 16 and 18 are increased, the bevel wheels 46 and 48 and the driven shaft 40 are accelerated steplessly.

When the fluid pressures in the four cylinders 26, 28, 56, and 58 are equalized with each other, the positions of the four bevel wheels 16, 18, 46, and 48 are stabilized. Meantime, the bevel wheel 48 presses the fork 94 leftwards resulting in the rack 86 moving leftwards. As the pinion 82 is positioned at a fixed place at this period, the rack 84 is forced to be restored to the original position while the stepless change in speed is effected.

The speed of the driven shaft 40 is decreased in the following manner. Handle 78 is turned to move rod 80 to the right as shown in FIG. 1. As rack 86 remains stationary, gear 82 will rotate counterclockwise and move rack 84 to the right. This moves the piston inwardly to increase the pressure withtin the valve 76 and thus to increase the pressure in the line 66 relative to that in the line 36. As a consequence, the pistons 52 and 54 will move toward each other, decreasing the distance between the pulley halves 46 and 48 and thus forcing the ring 98 to move diametrically outwardly of these pulleys. At the same time, due to the decreased relative pressure acting on the pistons 22 and 24, the latter will move outwardly in their cylinders further separating the pulley halves 16 and 18. During the movement of the pulley halves 46 and 48 toward each other, rack 86 will move to the right withdrawing the rack 84, through clockwise rotation of pinion 82, so that the pressures will again become equalized and the driving condition will be stabilized.

By virtue of the above mechanism, it becomes possible to change a speed of a driven shaft steplessly while the driving shaft rotates at a constant speed. It is required to operate the handle 78 merely in order to change the speed of the driven shaft. It is possible to make the stepless speed change means small-sized as the construction thereof is simple as described hereinbefore.

It will be seen that the two pistons 52 and 54 are subjected to the same pressure and the two bevel wheels 46 and 48 move symmetrically when the handle 78 is operated. Such symmetrical movements of the two bevel wheels 46 and 48 are assured by provision of the following positive means shown in FIG. 2. The bevel wheel 46 is provided with a rack 104 extending axially therefrom. The bevel wheel 48 is provided with a rack 102 extending axially therefrom. A pinion 100 is mounted rotatably on a pin which extends radially from the driven shaft 40, and so adapted as to be in mesh with both the racks 102 and 104 positioned opposite each other. By virtue of this mechanism, the two bevel wheels 46 and 48 are restrained by each other so as to move completely symmetrically.

While a particular embodiment of this invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

What is claimed as new and desired to be secured by Letters Patent of the United States is:

1. In a speed changing means comprising a driving shaft, a driven shaft, a pair of driving bevel wheels mounted axially slidably on said driving shaft, a pair of driven bevel wheels mounted axially slidably on said driven shaft, and a steel ring passing over said two pairs of bevel wheels: a stepless means for changing the position of said steel ring relative to said two shafts, which comprises four cylinders in engagement with four pistons formed on the backs of said four bevel wheels, respectively, four spaces between said four cylinders and four pistons being filled with a fluid compressed by a compressor, and a relief valve inserted between the compressor and the two spaces between the two cylinders and the two pistons formed on the backs of the driven bevel wheels, said relief valve being operated by means of a handle so as to change the pressure of said fluid in the last-named two spaces, whereby the position of said steel ring relative to said two shafts is changed steplessly.

2. In a speed changing means comprising a driving shaft, a driven shaft, a pair of driving bevel wheels mounted axially slidably on said driving shaft, a pair of driven bevel wheels mounted axially slidably on said driven shaft, and a steel ring passing over said two pairs of bevel wheels: a stepless means for changing the position of said steel ring relative to said two shafts, which comprises four cylinders in engagement with four pistons formed on the backs of said four bevel wheels, respectively, four spaces between said four cylinders and four pistons being filled with a fluid compressed by a compressor, a relief valve inserted between the compressor and the two spaces between the two cylinders and the two pistons formed on the backs of the driven bevel wheels, and a differential gear mechanism having two racks and a pinion operated by a handle, one of said two racks being adapted to operate said relief valve so as to change the pressure of said fluid in the last-named two spaces when the other of said two racks is restrained whereby the position of said steel ring relative to said two shafts is changed, and the other of said two racks being adapted to be forced to move in accordance with an axial movement of one of the driven bevel wheels so as to restore said one of said two racks to the original position when said handle is not operated.

References Cited in the file of this patent
UNITED STATES PATENTS

| | | |
|---|---|---|
| 2,199,491 | Heynau | May 7, 1940 |
| 2,441,276 | Kiner | May 11, 1948 |
| 2,475,954 | Gerbing | July 12, 1949 |
| 2,871,715 | Rieser | Feb. 3, 1959 |

FOREIGN PATENTS

| | | |
|---|---|---|
| 721,635 | Germany | June 12, 1942 |
| 8,451 | Great Britain | Apr. 11, 1907 |